US012635710B2

(12) United States Patent
Chen et al.

(10) Patent No.: US 12,635,710 B2
(45) Date of Patent: May 26, 2026

(54) METHODS OF USING FORMALDEHYDE-FREE ANTIMICROBIAL COMPOSITIONS IN ANIMAL BY-PRODUCT COMPOSITIONS

(71) Applicant: Eastman Chemical Company, Kingsport, TN (US)

(72) Inventors: Ying Chen, San Diego, CA (US); William Mark Barbour, Kingsport, TN (US); Weimin Gu, Kingsport, TN (US); Kelmara Khadene Kelly, Washington, DC (US)

(73) Assignee: Eastman Chemical Company, Kingsport, TN (US)

( * ) Notice: Subject to any disclaimer, the term of this patent is extended or adjusted under 35 U.S.C. 154(b) by 296 days.

(21) Appl. No.: 18/554,320

(22) PCT Filed: Apr. 8, 2022

(86) PCT No.: PCT/US2022/023981

§ 371 (c)(1),
(2) Date: Oct. 6, 2023

(87) PCT Pub. No.: WO2022/217031

PCT Pub. Date: Oct. 13, 2022

(65) Prior Publication Data

US 2024/0215608 A1      Jul. 4, 2024

Related U.S. Application Data

(60) Provisional application No. 63/201,005, filed on Apr. 8, 2021.

(51) Int. Cl.
A23K 20/158          (2016.01)
A23J 3/04           (2006.01)

(52) U.S. Cl.
CPC ............... A23J 3/04 (2013.01); A23K 20/158 (2016.05)

(58) Field of Classification Search
CPC ................................. A23J 3/04; A23K 20/158
See application file for complete search history.

(56) References Cited

U.S. PATENT DOCUMENTS

| | | | |
|---|---|---|---|
| 2012/0128843 A1 | 5/2012 | Richardson et al. | |
| 2012/0252893 A1 | 10/2012 | Pimentel | |

FOREIGN PATENT DOCUMENTS

| | | | | |
|---|---|---|---|---|
| CN | 107333977 | A | 11/2017 | |
| CN | 107927416 | A * | 4/2018 | ........... A23K 20/158 |
| CN | 107950792 | A | 4/2018 | |
| CZ | 14859 | U1 * | 12/2004 | |
| EP | 0219997 | A1 * | 4/1987 | ............ A23K 30/00 |
| EP | 2749297 | A1 | 7/2014 | |

| | | | | |
|---|---|---|---|---|
| WO | WO-9966804 | A1 * | 12/1999 | ............ A23K 50/75 |
| WO | WO 2004/019683 | A2 | 3/2004 | |
| WO | WO-2004076400 | A1 * | 9/2004 | ............ C07C 69/40 |
| WO | WO 2011/017367 | A2 | 2/2011 | |

OTHER PUBLICATIONS

Foods, N. A. C. O. M. C. F. (2019). Response to Questions Posed by the Food Safety and Inspection Service Regarding *Salmonella* Control Strategies in Poultry: Adopted Aug. 7, 2018, Washington, DC. Journal of Food Protecion, 82(4), 645-668.

Jones, F. T. (2011). A review of practical *Salmonella* control measures in animal feed. Journal of Applied Poultry Research, 20(1), 102-113.

Koyuncu, S., Andersson, M. G., Löfström, C., Skandamis, P. N., Gounadaki, A., Zentek, J., & Häggblom, P. (2013). Organic acids for control of *Salmonella* in different feed materials. BMC veterinary research, 9(1), 81.

Lien Vande Maele et al: "In vitro susceptibility of Brachyspira hyodysenteriae to organic acids and essential oil components", Journal of Veternary Medical Science—Nihon Juigaki Zassi, vol. 78, No. 2, Jan. 1, 2016, pp. 325-328.

Van Immerseel, F., Cauwerts, K., Devriese, L. A., Haesebrouck, F., & Ducatelle, R. (2002). Feed additives to control *Salmonella* in poultry. World's Poultry Science Journal, 58(4), 501-513.

Wales, A. D., Allen, V. M., & Davies, R. H. (2010). Chemical treatment of animal feed and water for the control of *Salmonella*. Foodborne Pathogens and Disease, 7(1), 3-15.

USDA Finalizes New Food Safety Measures to Reduce *Salmonella* and Campylobacter in Poultry https://www.usda.gov/media/press-releases/2016/02/04/usda-finalizes-new-food-safety-measures-reduce-salmonella-and, pub date 2016.

Poultry experts identify weak links in live production that can compromise *Salmonella* control https://thepoultrysite.com/news/2019/03/poultry-experts-identify-weak-links-in-live-production-that-can-compromise-salmonella-control, pub date 2019.

https://nutriad.com/2015/01/salmonella-control-in-feed/, pub date 2015.

Ban on formaldehyde in poultry feed https://www.allaboutfeed.net/Feed-Additives/Articles/2018/4/Ban-on-formaldehyde-in-poultry-feed-272812E/, pub date 2018.

Notification of Transmittal of The International Search Report and The Written Opinion of the International Searching Authority, or the Declaration with Date of Mailing Jul. 21, 2022 received in International Application No. PCT/US2022/023981.

Notification of European Search Report with date of mailing of completion of Apr. 1, 2020 received in European Application No. 19202019.6.

* cited by examiner

*Primary Examiner* — Benjamin J Packard

(74) *Attorney, Agent, or Firm* — Kenrick L. Vidale

(57)          ABSTRACT

Formaldehyde is a common component of antimicrobial compositions for preserving animal feeds. However, the use of formaldehyde is coming under pressure and alternative antimicrobial compositions are needed. The present application discloses methods and/or uses of a formaldehyde-free antimicrobial composition comprising formic acid and propionic acid in the making of rendered animal protein compositions or in the inhibiting of the development of *Salmonella* bacteria in animal by-product compositions (e.g., rendered animal proteins) while maintaining higher protein digestibility comparing with formaldehyde.

15 Claims, No Drawings

METHODS OF USING FORMALDEHYDE-FREE ANTIMICROBIAL COMPOSITIONS IN ANIMAL BY-PRODUCT COMPOSITIONS

CROSS-REFERENCE TO RELATED APPLICATION(S)

This application is a national stage filing under 35 USC § 371 of International Application Number PCT/US2022/023981, filed on, Apr. 8, 2022 which claims the benefit of the filing date to U.S. Provisional Application No. 63/201,005, filed on Apr. 8, 2021, the entire disclosures of which are incorporated by reference herein.

FIELD OF THE INVENTION

The present application discloses methods for inhibiting the growth and development of pathogens, including *Salmonella*, in animal by-product compositions.

BACKGROUND OF THE INVENTION

Animal by-products (e.g., fishmeal, chicken by-product meal, chicken meat bone meal, other rendered animal protein) may be heavily contaminated with *Salmonella* from the source materials. If such animal by-products are used to make animal feed, the animal by-products may introduce or reintroduce *Salmonella* into the other ingredients used to make the animal feed, resulting in a contaminated final product.

One way of controlling the *Salmonella* contamination is to treat the final feed product using heat and/or chemical treatments. Another way of controlling *Salmonella* contamination is to pre-treat the ingredients, such as animal by-products, used to make the animal feed to reduce or eliminate *Salmonella* contamination. One could also use a combination (e.g., pretreatment of ingredients along heat and/or chemical treatment of final product) of approaches to achieve reduced *Salmonella* contamination.

Blends of short-chain organic acids (e.g., formic acid and propionic acid) and formaldehyde have been used to chemically control *Salmonella* contamination in animal feed. Formaldehyde has been used as a potent active substance for the chemical control of *Salmonella* infections in feed and feed ingredients. Indeed, formaldehyde displays strong antiseptic activity against most bacteria through irreversible protein cross-linking, and is particularly acknowledged as one of the most effective substances for controlling *Salmonella* outbreaks. However, several adverse side-effects of formaldehyde, such as carcinogenic and corrosive properties, have been identified over the past. Moreover, formaldehyde is a volatile substance that may evaporate in open systems and factory workers are particularly at risk of overexposure. Consequently, the European Commission has agreed on regulatory actions for banning formaldehyde as feed additive as of the start of 2018.

There is thus an urgent need for innovative, effective, environmentally safe, and cost-effective formaldehyde-free processes and/or formulations for controlling *Salmonella* in animal by-products.

SUMMARY OF THE INVENTION

The present application discloses a method of making an animal by-product composition, comprising:

(I) mixing an animal by-product with an effective amount of an antimicrobial composition, comprising:
    (i) 15 to 60 weight percent (wt %) $CH_3CHR^1COOH$, wherein $R^1$ is H or OH; and
    (ii) 30 to 80 wt % formic acid,
wherein all wt % are relative to the total weight of the antimicrobial composition.

The present application discloses a method of inhibiting the development of the species of the genus *Salmonella* in an animal by-product composition comprising adding an effective amount of an antimicrobial composition, comprising:
    (i) 15 to 60 weight percent (wt %) $CH_3CHR^1COOH$, wherein $R^1$ is H or OH; and
    (ii) 30 to 80 wt % formic acid,
wherein each component is based on the total weight of the antimicrobial composition;
to the animal by-product composition.

The present application discloses the use of an antimicrobial composition: comprising:
    (I) 15 to 60 weight percent (wt %) $CH_3CHR^1COOH$, wherein $R^1$ is H or OH; and
    (II) 30 to 80 wt % formic acid,
for inhibiting the development of species of the genus *Salmonella* in an animal by-product composition.

DETAILED DESCRIPTION OF THE INVENTION

In this specification and in the claims that follow, reference will be made to a number of terms, which shall be defined to have the following meanings.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

"Animal by-product" means materials from animals that people do not consume. Animal by-products can be carcasses and parts of carcasses from slaughterhouses, animal shelters, zoos and veterinarians, and products of animal origin not intended for human consumption, including catering waste. Animal by-products can be subjected to a process call "rendering" to kill pathogens and to make the material stable and usable, and as such animal by-product includes rendered animal protein. The rendering process dries the material and separates the fat from the bone and protein to yield a fat and a protein meal (e.g., meat and bone meal, poultry by-product meal, etc.). Other materials such as blood, feathers and hair can be rendered to produce animal by-products.

Surfactant is understood to be composition containing one or more substances. Surfactants can advantageously be used to stabilize the antimicrobial composition so that the composition maintains one single liquid phase. Surfactant refers to cationic, anionic, amphoteric or nonionic surfactants. Non-limiting examples of cationic surfactants include cetrimonium bromide, cetylpyridinium chloride, benzalkonium chloride, benzethonium chloride, dimethyldioctadecylammonium chloride and dioctadecylmethylammonium bromide.

Non-limiting examples of anionic surfactants include ammonium lauryl sulfate, sodium lauryl sulfate, sodium dodecyl sulfate, sodium laureth sulfate, sodium myreth sulfate, dioctyl sodium sulfosuccinate, perfluorooctanesulfonate, perfluorobutanesulfonate, alkyl-aryl ether phosphates and alkyl ether phosphates.

Non-limiting examples of amphoteric surfactants include alkyl betaine, alkyl dimethyl betaine, alkylamido betaine, alkyl amide betaine, alkylamidopropyl betaine, alkyl dimethylammonium betaine, alkyl amidopropyl betaine, alkyl sulfobetaine; alkyl, alkylampho glycinate, alkylamphocarboxy glycinate, alkyl or alkyl substituted imidazoline monocarboxylate, alkyl or alkyl substituted imidazoline dicarboxylate, sodium salts of alkyl monocarboxylates, sodium salts of alkyl monocarboxylates, alkyl beta amino acids, alkyl amidopropyl hydroxysultaine, alkyl ether hydroxysultaine, alkyl amidopropyl dimethyl ammonia acetate, alkyl ampho monoacetate, alkyl ampho diacetate, alkyl dipropionate, alkyl ampho dipropionate, alkyl imino dipropionate, alkyl amphopropionate, alkyl beta amino propionic acid, alkyl dipropionate, alkyl beta iminodipropionate, branched or n-alkyl dimethylamidopropionate, alkyl carboxylated propionate, alkyl imidazoline, methyl alkyl imidazoline, fluorinated alkyl amphoteric mixtures.

Non-limiting examples of non-ionic surfactants notably include polyethoxylated fatty acids; vegetable oils; fatty alcohols; alcohol alkoxylates; alkoxylated alkyl alcohols; polyoxyethylene alkyl alcohols; polyol esters of fatty acids; polyoxyethylene esters of fatty acids; fatty acid amides; polyoxyethylene fatty acid amides; polyalkylene oxide block copolymers; ethoxylated alkyl mercaptans and the like.

Non-ionic surfactants may be chosen among octaethylene glycol monododecyl ether, pentaethylene glycol monododecyl ether, nonoxynols, polyoxyethylene octyl phenyl ether, polyethoxylated tallow amine, cocoamide monoethanolamine, cocoamide dietholamine, poloxamers, glycerol monostearate, glycerol monolaurate, sorbitan monolaurate, sorbitan monosetearate, sorbitan tristearate, polyethylene glycol sorbitan monolaurate, (i.e. PEG(20)sorbitan monolaurate), polyethylene glycol (20) sorbitan monostearate, polyoxyethylene (20) sorbitan monooleate, polyoxyethylene (20) sorbitan monopalmitate, decyl glucoside, lauryl glucoside, octyl glucoside, lauryldimethylamine oxide, Brij™, glycerol, glyceryl polyethylene glycol ricinoleate (PEG); wherein the number of ethylene oxide units varies from 2 to 200, polyglyceryl ester, polyglyceryl monooleate, decaglyceryl monocaprylate, propylene glycol dicaprilate, triglycerol monostearate, ethoxylated castor oil or mixtures thereof.

Non-ionic surfactants may be chosen among glyceryl polyethylene glycol ricinoleate (PEG), wherein the number of ethylene oxide units varies from 2 to 200.

The term "terpene" refers to organic compounds construed of multiples of the 5-carbon hydrocarbon isoprene unit, or 2-methyl-1,3-butadiene, and derivatives thereof. Terpenes containing two isoprene unites are called monoterpenes, those containing three such units are sesquiterpenes, and those having four isoprene unites are diterpenes. Additionally, higher order terpenes exist and there is not upper limit to how many isoprene unites a terpene may include. Within the context of the invention, the term "terpene" also includes derivatives generally referred to as "terpenoids", which are saturated or partially unsaturated isomers of regular terpenes as well as derivatives such as alcohols, ketones, aldehydes, esters, etc.

The monoterpene according to the present invention can either be a cyclic or an acyclic monoterpene. The term "cyclic" refers to compounds which include a ring structure, such as a six carbon ring. Cyclic monoterpenes include monocyclic, bicyclic or tricyclic monoterpenes. The terms "acyclic", "noncyclic" or "linear" mean that the compound does not include a ring structure, but is rather linear in its formulaic depiction.

The present application discloses a method of making an animal by-product composition, comprising: (I) mixing an animal by-product with an effective amount of an antimicrobial composition, comprising: (i) 15 to 60 weight percent (wt %) $CH_3CHR^1COOH$, wherein $R^1$ is H or OH; and (ii) 30 to 80 wt % formic acid, wherein all wt % are relative to the total weight of the antimicrobial composition.

$(C_{6-12})$Fatty acids (e.g., medium chain fatty acids) typically safe for animal consumption are those derived from fats and oils derived from edible sources. Examples of $(C_{6-12})$fatty acids include caprylic acid, capric acid, lauric acid, or mixtures thereof.

In one embodiment, or in the alternative in combination with any other embodiment, the antimicrobial composition further comprises (iii) 1 to 30 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iii) 1 to 15 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, wherein the antimicrobial composition further comprises (iii) 16 to 30 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the (C$_{6-12}$)fatty acid comprises caprylic acid. In one class of this embodiment, the (C$_{6-12}$)fatty acid comprises lauric acid.

In one embodiment, or in the alternative in combination with any other embodiment, the antimicrobial composition further comprises (iii) 10 to 20 wt % of a (C$_{6-12}$)fatty acid. In one class of this embodiment, the (C$_{6-12}$)fatty acid comprises caprylic acid, capric acid, lauric acid, or mixtures thereof. In one class of this embodiment, the (C$_{6-12}$)fatty acid comprises caprylic acid. In one class of this embodiment, the (C$_{6-12}$)fatty acid comprises caprylic acid. In one class of this embodiment, the (C$_{6-12}$)fatty acid comprises lauric acid.

In one embodiment, or in the alternative in combination with any other embodiment, the antimicrobial composition further comprises (iv) 0.05 to 50 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl)oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 0.05 to 25 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl)oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 26 to 50 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl) oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 15 to 35 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl) oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises: (v) less than 30 wt % water. In one embodiment, or in the alternative in combination with any other embodiment, the antimicrobial composition further comprises: (v) less than 25 wt % water. In one embodiment, or in the alternative in combination with any other embodiment, the antimicrobial composition further comprises: (v) less than 20 wt % water. In one embodiment, or in the alternative in combination with any other embodiment, the antimicrobial composition further comprises: (v) less than 15 wt % water. In one embodiment, or in the alternative in combination with any other embodiment, the antimicrobial composition further comprises: (v) less than 10 wt % water. In one embodiment, or in the alternative in combination with any other embodiment, the antimicrobial composition further comprises: (v) less than 5 wt % water. In one embodiment, or in the alternative in combination with any other embodiment, the antimicrobial composition further comprises: (v) less than 2 wt % water. In one embodiment, or in the alternative in combination with any other embodiment, the antimicrobial composition further comprises: (v) less than 1 wt % water.

In one embodiment, or in the alternative in combination with any other embodiment, the antimicrobial composition further comprises (vi) 0.05 to 15 wt % of a surfactant. In one embodiment, or in the alternative in combination with any other embodiment, the antimicrobial composition further comprises (vi) 0.05 to 7 wt % of a surfactant. In one embodiment, or in the alternative in combination with any other embodiment, the antimicrobial composition further comprises (vi) 7 to 15 wt % of a surfactant. In one embodiment, or in the alternative in combination with any other embodiment, the antimicrobial composition further comprises (vi) 3 to 11 wt % of a surfactant.

In one embodiment, or in the alternative in combination with any other embodiment, the antimicrobial composition further comprises (vii) 0.05 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 0.05 wt % to 10 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 11 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 5 wt % to 15 wt % of a formate salt. In one class of this embodiment, the formate salt is sodium formate, potassium formate, calcium formate, magnesium formate, or mixtures thereof.

In one embodiment, or in the alternative in combination with any other embodiment, the pH of the antimicrobial composition is from 3.4 to 6.0, from 3.4 to 5.5, from 3.4 to 5.0, from 3.4 to 4.5, or less than 4.0.

In one embodiment, or in the alternative in combination with any other embodiment, the effective amount of the antimicrobial composition is less than 10 wt %, or is less than 5 wt %, or is less than 2.0 wt %, or is less than 1.5 wt %, or is less than 1.0 wt %, or is less than 0.5 wt %, based on the total weight of the animal by-product composition.

In one embodiment, or in the alternative in combination with any other embodiment, the antimicrobial composition is formaldehyde-free.

In one embodiment, or in the alternative in combination with any other embodiment, $R^1$ is H. In one embodiment, or in the alternative in combination with any other embodiment, $R^1$ is OH.

The present application discloses a method of inhibiting the development of the species of the genus *Salmonella* in an animal by-product composition comprising adding an effective amount of an antimicrobial composition, comprising: (i) 15 to 60 weight percent (wt %) $CH_3CHR^1COOH$, wherein $R^1$ is H or OH; and (ii) 30 to 80 wt % formic acid, wherein each component is based on the total weight of the antimicrobial composition; to the animal by-product composition.

In one embodiment, or in the alternative in combination with any other embodiment, the antimicrobial composition further comprises (iii) 1 to 30 wt % of a ($C_{6-12}$)fatty acid. In one class of this embodiment, the ($C_{6-12}$)fatty acid comprises caprylic acid, capric acid, lauric acid, or mixtures thereof. In one class of this embodiment, the ($C_{6-12}$)fatty acid comprises caprylic acid. In one class of this embodiment, the ($C_{6-12}$)fatty acid comprises caprylic acid. In one class of this embodiment, the ($C_{6-12}$)fatty acid comprises lauric acid.

In one embodiment, or in the alternative in combination with any other embodiment, the antimicrobial composition further comprises (iii) 1 to 15 wt % of a ($C_{6-12}$)fatty acid. In one class of this embodiment, the ($C_{6-12}$)fatty acid comprises caprylic acid, capric acid, lauric acid, or mixtures thereof. In one class of this embodiment, the ($C_{6-12}$)fatty acid comprises caprylic acid. In one class of this embodiment, the ($C_{6-12}$)fatty acid comprises caprylic acid. In one class of this embodiment, the ($C_{6-12}$)fatty acid comprises lauric acid.

In one embodiment, or in the alternative in combination with any other embodiment, wherein the antimicrobial composition further comprises (iii) 16 to 30 wt % of a ($C_{6-12}$) fatty acid. In one class of this embodiment, the ($C_{6-12}$)fatty acid comprises caprylic acid, capric acid, lauric acid, or mixtures thereof. In one class of this embodiment, the ($C_{6-12}$)fatty acid comprises caprylic acid. In one class of this embodiment, the ($C_{6-12}$)fatty acid comprises caprylic acid. In one class of this embodiment, the ($C_{6-12}$)fatty acid comprises lauric acid.

In one embodiment, or in the alternative in combination with any other embodiment, the antimicrobial composition further comprises (iii) 10 to 20 wt % of a ($C_{6-12}$)fatty acid. In one class of this embodiment, the ($C_{6-12}$)fatty acid comprises caprylic acid, capric acid, lauric acid, or mixtures thereof. In one class of this embodiment, the ($C_{6-12}$)fatty acid comprises caprylic acid. In one class of this embodiment, the ($C_{6-12}$)fatty acid comprises caprylic acid. In one class of this embodiment, the ($C_{6-12}$)fatty acid comprises lauric acid.

In one embodiment, or in the alternative in combination with any other embodiment, the antimicrobial composition further comprises (iv) 0.05 to 50 wt % of a monoterpene. In one class of this embodiment, the monoterpene comprises (−)-menthyl acetate, (+)-camphoric acid, cantharidin, carvacrol, p-cymene, (R)-(−)-carvone, (S)-(+)-carvone, cis-(−)-carveol, m-cymene, o-cymene, (1S,3R)-(−)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (−)-limonene, linalool oxide, (−)-α-phellandrene, α-terpinene, γ-terpinene, terpinen-4-ol, α-terpineol, β-terpineol, γ-terpineol, isopulegol, (+)-menthol, (−)-menthol, thymol, (−)-menthone, (−)-menthol, (−)-menthoxyacetyl chloride, menthoxyacetic acid, (−)-menthyl chloride, (−)-menthyl chloroformate, (1R, 2S,5R)-(−)-menthyl (S)-p-toluenesulfinate, (1S,2R,5S)-(+)-menthyl (R)-p-toluenesulfinate, (+)-menthyl chloroformate, 8-mercaptomenthone, (−)-menthyl succinate, (+)-menthyl acetate, (+)-neomenthol, (−)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (−)-borneol, (+)-3-bromocamphor-8-sulfonic acid, (−)-3-bromocamphor-8-sulfonic acid, (+)-camphene, (−)-camphene, (+)-camphor, (−)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl)oxaziridine, (2S,8aR)-(−)-(camphorylsulfonyl)oxaziridine, (+)-10-camphorsulfonimine, (−)-10-camphorsulfonimine, (1R)-(−)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1 S)-(−)-10-mercaptoisoborneol, (1 S)-(−)-10-mercaptoborneol, (1R)-(−)-myrtenal, (1R)-(−)-myrtenal, (1 S)-(−)-α-pinene, (−)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(−)-thio-camphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 0.05 to 25 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl) oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 26 to 50 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl) oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 15 to 35 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl)oxaziridine, (2S,8aR)-(−)-(camphorylsulfonyl)oxaziridine, (+)-10-camphorsulfonimine, (−)-10-camphorsulfonimine, (1R)-(−)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1 S)-(−)-10-mercaptoisoborneol, (1 S)-(−)-10-mercaptoborneol, (1R)-(−)-myrtenal, (1R)-(−)-myrtenal, (1 S)-(−)-α-pinene, (−)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(−)-thiocamphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises: (v) less than 30 wt % water. In one embodiment, or in the alternative in combination with any other embodiment, the antimicrobial composition further comprises: (v) less than 25 wt % water. In one embodiment, or in the alternative in combination with any other embodiment, the antimicrobial composition further comprises: (v) less than 20 wt % water. In one embodiment, or in the alternative in combination with any other embodiment, the antimicrobial composition further comprises: (v) less than 15 wt % water. In one embodiment, or in the alternative in combination with any other embodiment, the antimicrobial composition further comprises: (v) less than 10 wt % water. In one embodiment, or in the alternative in combination with any other embodiment, the antimicrobial composition further comprises: (v) less than 5 wt % water. In one embodiment, or in the alternative in combination with any other embodiment, the antimicrobial composition further comprises: (v) less than 2 wt % water. In one embodiment, or in the alternative in combination with any other embodiment, the antimicrobial composition further comprises: (v) less than 1 wt % water.

In one embodiment, or in the alternative in combination with any other embodiment, the antimicrobial composition further comprises (vi) 0.05 to 15 wt % of a surfactant. In one embodiment, or in the alternative in combination with any other embodiment, the antimicrobial composition further comprises (vi) 0.05 to 7 wt % of a surfactant. In one embodiment, or in the alternative in combination with any other embodiment, the antimicrobial composition further comprises (vi) 7 to 15 wt % of a surfactant. In one embodiment, or in the alternative in combination with any other embodiment, the antimicrobial composition further comprises (vi) 3 to 11 wt % of a surfactant.

In one embodiment, or in the alternative in combination with any other embodiment, the antimicrobial composition further comprises (vii) 0.05 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 0.05 wt % to 10 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 11 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 5 wt % to 15 wt % of a formate salt. In one class of this embodiment, the formate salt is sodium formate, potassium formate, calcium formate, magnesium formate, or mixtures thereof.

In one embodiment, or in the alternative in combination with any other embodiment, the pH of the antimicrobial composition is from 3.4 to 6.0, from 3.4 to 5.5, from 3.4 to 5.0, from 3.4 to 4.5, or less than 4.0.

In one embodiment, or in the alternative in combination with any other embodiment, the effective amount of the antimicrobial composition is less than 10 wt %, or is less than 5 wt %, or is less than 2.0 wt %, or is less than 1.5 wt %, or is less than 1.0 wt %, or is less than 0.5 wt %, based on the total weight of the animal by-product composition.

In one embodiment, or in the alternative in combination with any other embodiment, the antimicrobial composition is formaldehyde-free.

In one embodiment, or in the alternative in combination with any other embodiment, $R^1$ is H. In one embodiment, or in the alternative in combination with any other embodiment, $R^1$ is OH.

The present application discloses the use of an antimicrobial composition: comprising: (I) 15 to 60 weight percent (wt %) $CH_3CHR^1COOH$, wherein $R^1$ is H or OH; and (II) 30 to 80 wt % formic acid, for inhibiting the development of species of the genus *Salmonella* in an animal by-product composition.

In one embodiment, or in the alternative in combination with any other embodiment, the antimicrobial composition further comprises (iii) 1 to 30 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iii) 1 to 15 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, wherein the antimicrobial composition further comprises (iii) 16 to 30 wt % of a $(C_{6-12})$ fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iii) 10 to 20 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iv) 0.05 to 50 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl) oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 0.05 to 25 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R, 2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl) oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 26 to 50 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (−)-menthol, thymol, (−)-menthone, (−)-menthol, (−)-menthoxyacetyl chloride, menthoxyacetic acid, (−)-menthyl chloride, (−)-menthyl chloroformate, (1R, 2S,5R)-(−)-menthyl (S)-p-toluenesulfinate, (1S,2R,5S)-(+)-menthyl (R)-p-toluenesulfinate, (+)-menthyl chloroformate, 8-mercaptomenthone, (−)-menthyl succinate, (+)-menthyl acetate, (+)-neomenthol, (−)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (−)-borneol, (+)-3-bromocamphor-8-sulfonic acid, (−)-3-bromocamphor-8-sulfonic acid, (+)-camphene, (−)-camphene, (+)-camphor, (−)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl)oxaziridine, (2S,8aR)-(−)-(camphorylsulfonyl)oxaziridine, (+)-10-camphorsulfonimine, (−)-10-camphorsulfonimine, (1R)-(−)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1 S)-(−)-10-mercaptoisoborneol, (1 S)-(−)-10-mercaptoborneol, (1R)-(−)-myrtenal, (1R)-(−)-myrtenal, (1 S)-(−)-α-pinene, (−)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(−)-thiocamphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 15 to 35 wt % of a monoterpene. In one class of this embodiment, the monoterpene comprises (−)-menthyl acetate, (+)-camphoric acid, cantharidin, carvacrol, p-cymene, (R)-(−)-carvone, (S)-(+)-carvone, cis-(−)-carveol, m-cymene, o-cymene, (1S,3R)-(−)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (−)-limonene, linalool oxide, (−)-α-phellandrene, α-terpinene, γ-terpinene, terpinen-4-ol, α-terpineol, β-terpineol, γ-terpineol, isopulegol, (+)-menthol, (−)-menthol, thymol, (−)-menthone, (−)-menthol, (−)-menthoxyacetyl chloride, menthoxyacetic acid, (−)-menthyl chloride, (−)-menthyl chloroformate, (1R, 2S,5R)-(−)-menthyl (S)-p-toluenesulfinate, (1S,2R,5S)-(+)-menthyl (R)-p-toluenesulfinate, (+)-menthyl chloroformate, 8-mercaptomenthone, (−)-menthyl succinate, (+)-menthyl acetate, (+)-neomenthol, (−)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (−)-borneol, (+)-3-bromocamphor-8-sulfonic acid, (−)-3-bromocamphor-8-sulfonic acid, (+)-camphene, (−)-camphene, (+)-camphor, (−)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl)oxaziridine, (2S,8aR)-(−)-(camphorylsulfonyl)oxaziridine, (+)-10-camphorsulfonimine, (−)-10-camphorsulfonimine, (1R)-(−)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1 S)-(−)-10-mercaptoisoborneol, (1 S)-(−)-10-mercaptoborneol, (1R)-(−)-myrtenal, (1R)-(−)-myrtenal, (1 S)-(−)-α-pinene, (−)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(−)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises: (v) less than 30 wt % water. In one embodiment, or in the alternative in combination with any other embodiment, the antimicrobial composition further comprises: (v) less than 25 wt % water. In one embodiment, or in the alternative in combination with any other embodiment, the antimicrobial composition further comprises: (v) less than 20 wt % water. In one embodiment, or in the alternative in combination with any other embodiment, the antimicrobial composition further comprises: (v) less than 15 wt % water. In one embodiment, or in the alternative in combination with any other embodiment, the antimicrobial composition further comprises: (v) less than 10 wt % water. In one embodiment, or in the alternative in combination with any other embodiment, the antimicrobial composition further comprises: (v) less than 5 wt % water. In one embodiment, or in the alternative in combination with any other embodiment, the antimicrobial composition further comprises: (v) less than 2 wt % water. In one embodiment, or in the alternative in combination with any other embodiment, the antimicrobial composition further comprises: (v) less than 1 wt % water.

In one embodiment, or in the alternative in combination with any other embodiment, the antimicrobial composition further comprises (vi) 0.05 to 15 wt % of a surfactant. In one embodiment, or in the alternative in combination with any other embodiment, the antimicrobial composition further comprises (vi) 0.05 to 7 wt % of a surfactant. In one embodiment, or in the alternative in combination with any other embodiment, the antimicrobial composition further comprises (vi) 7 to 15 wt % of a surfactant. In one embodiment, or in the alternative in combination with any other embodiment, the antimicrobial composition further comprises (vi) 3 to 11 wt % of a surfactant.

In one embodiment, or in the alternative in combination with any other embodiment, the antimicrobial composition further comprises (vii) 0.05 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 0.05 wt % to 10 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 11 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 5 wt % to 15 wt % of a formate salt. In one class of this embodiment, the formate salt is sodium formate, potassium formate, calcium formate, magnesium formate, or mixtures thereof.

In one embodiment, or in the alternative in combination with any other embodiment, the pH of the antimicrobial composition is from 3.4 to 6.0, from 3.4 to 5.5, from 3.4 to 5.0, from 3.4 to 4.5, or less than 4.0.

In one embodiment, or in the alternative in combination with any other embodiment, the effective amount of the antimicrobial composition is less than 10 wt %, or is less than 5 wt %, or is less than 2.0 wt %, or is less than 1.5 wt %, or is less than 1.0 wt %, or is less than 0.5 wt %, based on the total weight of the animal by-product composition.

In one embodiment, or in the alternative in combination with any other embodiment, the antimicrobial composition is formaldehyde-free.

In one embodiment, or in the alternative in combination with any other embodiment, $R^1$ is H. In one embodiment, or in the alternative in combination with any other embodiment, $R^1$ is OH.

The present application also discloses an antimicrobial composition, comprising: (i) 15 to 30 weight percent (wt %) $CH_3CHR^1COOH$, wherein $R^1$ is H or OH; and (ii) 40 to 70 wt % formic acid, wherein all wt % are relative to the total weight of the antimicrobial composition.

In one embodiment, or in the alternative in combination with any other embodiment, the antimicrobial composition further comprises (iii) 1 to 30 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iii) 1 to 15 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, wherein the antimicrobial composition further comprises (iii) 16 to 30 wt % of a $(C_{6-12})$ fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iii) 10 to 20 wt % of a $(C_{6-12})$fatty acid. In one class of this embodiment, the $(C_{6-12})$fatty acid comprises caprylic acid, capric acid, lauric acid, or mixtures thereof. In one class of this embodiment, the $(C_{6-12})$fatty acid comprises caprylic acid. In one class of this embodiment, the $(C_{6-12})$fatty acid comprises caprylic acid. In one class of this embodiment, the $(C_{6-12})$fatty acid comprises lauric acid.

In one embodiment, or in the alternative in combination with any other embodiment, the antimicrobial composition further comprises (iv) 0.05 to 50 wt % of a monoterpene. In one class of this embodiment, the monoterpene comprises (–)-menthyl acetate, (+)-camphoric acid, cantharidin, carvacrol, p-cymene, (R)-(–)-carvone, (S)-(+)-carvone, cis-(–)-carveol, m-cymene, o-cymene, (1S,3R)-(–)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (–)-limonene, linalool oxide, (–)-α-phellandrene, α-terpinene, γ-terpinene, terpinen-4-ol, α-terpineol, β-terpineol, γ-terpineol, isopulegol, (+)-menthol, (–)-menthol, thymol, (–)-menthone, (–)-menthol, (–)-menthoxyacetyl chloride, menthoxyacetic acid, (–)-menthyl chloride, (–)-menthyl chloroformate, (1R,2S,5R)-(–)-menthyl (S)-p-toluenesulfinate, (1S,2R,5S)-(+)-menthyl (R)-p-toluenesulfinate, (+)-menthyl chloroformate, 8-mercaptomenthone, (–)-menthyl succinate, (+)-menthyl acetate, (+)-neomenthol, (–)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (–)-borneol, (+)-3-bromocamphor-8-sulfonic acid, (–)-3-bromocamphor-8-sulfonic acid, (+)-camphene, (–)-camphene, (+)-camphor, (–)-camphor, (1R)-camphor oxime, (+)-camphorquinone, (–)-camphorquinone, (+)-10-camphorsulfuric acid, (+)-10-camphorsulfuric acid, (–)-10-camphorsulfuric acid, sodium (+)-10-camphorsulfonate, sodium (–)-10-camphorsulfonate, (+)-3-carene, 1,8-cineole, (–)-10-camphosulfuric aid, (+)-10-camphorsulfonyl chloride, (–)-camphanic acid, (–)-camphanic chloride, (–)-camphor, (–)-10-camphosulfonyl chloride, (+)-10,2-camphorsultam, (–)-10,2-camphorsultam, (2R,8aS)-(+)-(camphorylsulfonyl)oxaziridine, (2S,8aR)-(–)-(camphorylsulfonyl)oxaziridine, (+)-10-camphorsulfonimine, (–)-10-camphorsulfonimine, (1R)-(–)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (–)-fenchone, fraxinellone, geniposide, genipin, (1R,2R,5R)-(+)-2-hydroxy-3-pinanone, (1S,2S,5S)-(–)-2-hydroxy-3-pinanone, (+)-isoborneol, (–)-isoborneol, isobornyl acetate, isobornyl methacrylate, isobornyl acrylate, (S)-(+)-ketopinic acid, (1 S)-(–)-10-mercaptoisoborneol, (1 S)-(–)-10-mercaptoborneol, (1R)-(–)-myrtenal, (1R)-(–)-myrtenal, (1 S)-(–)-α-pinene, (–)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(–)-thiocamphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 0.05 to 25 wt % of a monoterpene. In one class of this embodiment, the monoterpene comprises (−)-menthyl acetate, (+)-camphoric acid, cantharidin, carvacrol, p-cymene, (R)-(−)-carvone, (S)-(+)-carvone, cis-(−)-carveol, m-cymene, o-cymene, (1S,3R)-(−)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (−)-limonene, linalool oxide, (−)-α-phellandrene, α-terpinene, γ-terpinene, terpinen-4-ol, α-terpineol, β-terpineol, γ-terpineol, isopulegol, (+)-menthol, (−)-menthol, thymol, (−)-menthone, (−)-menthol, (−)-menthoxyacetyl chloride, menthoxyacetic acid, (−)-menthyl chloride, (−)-menthyl chloroformate, (1R, 2S,5R)-(−)-menthyl (S)-p-toluenesulfinate, (1S,2R,5S)-(+)-menthyl (R)-p-toluenesulfinate, (+)-menthyl chloroformate, 8-mercaptomenthone, (−)-menthyl succinate, (+)-menthyl acetate, (+)-neomenthol, (−)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (−)-borneol, (+)-3-bromocamphor-8-sulfonic acid, (−)-3-bromocamphor-8-sulfonic acid, (+)-camphene, (−)-camphene, (+)-camphor, (−)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl) oxaziridine, (2S,8aR)-(−)-(camphorylsulfonyl)oxaziridine, (+)-10-camphorsulfonimine, (−)-10-camphorsulfonimine, (1R)-(−)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1 S)-(−)-10-mercaptoisoborneol, (1 S)-(−)-10-mercaptoborneol, (1R)-(−)-myrtenal, (1R)-(−)-myrtenal, (1 S)-(−)-α-pinene, (−)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(−)-thiocamphor, (1R,4R,5R)-4,7,7-trimethyl-6-thiabicyclo[3.2.1.] octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises (iv) 26 to 50 wt % of a monoterpene. In one class of this embodiment, the monoterpene comprises (−)-menthyl acetate, (+)-camphoric acid, cantharidin, carvacrol, p-cymene, (R)-(−)-carvone, (S)-(+)-carvone, cis-(−)-carveol, m-cymene, o-cymene, (1S,3R)-(−)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (−)-limonene, linalool oxide, (−)-α-phellandrene, α-terpinene, γ-terpinene, In one embodiment, or in the alternative in combination with any other embodiment, the antimicrobial composition further comprises (iv) 15 to 35 wt % of a monoterpene. In one class of this embodiment, the monoterpene comprises (−)-menthyl acetate, (+)-camphoric acid, cantharidin, carvacrol, p-cymene, (R)-(−)-carvone, (S)-(+)-carvone, cis-(−)-carveol, m-cymene, o-cymene, (1S,3R)-(−)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (−)-limonene, linalool oxide, (−)-α-phellandrene, α-terpinene, γ-terpinene, terpinen-4-ol, α-terpineol, β-terpineol, γ-terpineol, isopulegol, (+)-menthol, (−)-menthol, thymol, (−)-menthone, (−)-menthol, (−)-menthoxyacetyl chloride, menthoxyacetic acid, (−)-menthyl chloride, (−)-menthyl chloroformate, (1R, 2S,5R)-(−)-menthyl (S)-p-toluenesulfinate, (1S,2R,5S)-(+)-menthyl (R)-p-toluenesulfinate, (+)-menthyl chloroformate, 8-mercaptomenthone, (−)-menthyl succinate, (+)-menthyl acetate, (+)-neomenthol, (−)-perillaldehyde, piperitone, (+)-pulegone, α-terpineol, terpinyl acetate, terpinolene, α-terpineol, terpin monohydrate, (+)-terpinen-4-ol, linalool oxide pyranoid, borneyl acetate, (+)-3-bromocamphor, (+)-borneol, (−)-borneol, (+)-3-bromocamphor-8-sulfonic acid, (−)-3-bromocamphor-8-sulfonic acid, (+)-camphene, (−)-camphene, (+)-camphor, (−)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl)oxaziridine, (2S,8aR)-(−)-(camphorylsulfonyl)oxaziridine, (+)-10-camphorsulfonimine, (−)-10-camphorsulfonimine, (1R)-(−)-camphorquinone, (1 S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1 S)-(−)-10-mercaptoisoborneol, (1 S)-(−)-10-mercaptoborneol, (1R)-(−)-myrtenal, (1R)-(−)-myrtenal, (1 S)-(−)-α-pinene, (−)-β-pinene, (1R)-(+)-α-pinene, pinene oxide (α- or β-), paeoniflorin, (1S,2S,3R,5S)-(+)-2,3-pinanediol, sabinene, swertiamarin, thujone (α- or β-), (1R)-(−)-thiocamphor, (1R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof. In one class of this embodiment, the monoterpene comprises thymol, carvacrol, eugenol, or a mixture thereof.

In one embodiment, or in the alternative in combination with any other embodiment, the antimicrobial composition further comprises: (v) less than 30 wt % water. In one embodiment, or in the alternative in combination with any other embodiment, the antimicrobial composition further comprises: (v) less than 25 wt % water. In one embodiment, or in the alternative in combination with any other embodiment, the antimicrobial composition further comprises: (v) less than 20 wt % water. In one embodiment, or in the alternative in combination with any other embodiment, the antimicrobial composition further comprises: (v) less than 15 wt % water. In one embodiment, or in the alternative in combination with any other embodiment, the antimicrobial composition further comprises: (v) less than 10 wt % water. In one embodiment, or in the alternative in combination with any other embodiment, the antimicrobial composition further comprises: (v) less than 5 wt % water. In one embodiment, or in the alternative in combination with any other embodiment, the antimicrobial composition further comprises: (v) less than 2 wt % water. In one embodiment, or in the alternative in combination with any other embodiment, the antimicrobial composition further comprises: (v) less than 1 wt % water.

In one embodiment, or in the alternative in combination with any other embodiment, the antimicrobial composition further comprises (vi) 0.05 to 15 wt % of a surfactant. In one embodiment, or in the alternative in combination with any other embodiment, the antimicrobial composition further comprises (vi) 0.05 to 7 wt % of a surfactant. In one embodiment, or in the alternative in combination with any other embodiment, the antimicrobial composition further comprises (vi) 7 to 15 wt % of a surfactant. In one embodiment, or in the alternative in combination with any other embodiment, the antimicrobial composition further comprises (vi) 3 to 11 wt % of a surfactant.

In one embodiment, or in the alternative in combination with any other embodiment, the antimicrobial composition further comprises (vii) 0.05 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 0.05 wt % to 10 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 11 wt % to 20 wt % of a formate salt. In one class of this embodiment, the formate salt is sodium formate, potassium formate, calcium formate, magnesium formate, or mixtures thereof.

In one embodiment, or in the alternative in combination with any other embodiment, the antimicrobial composition further comprises (vii) 5 wt % to 15 wt % of a formate salt. In one class of this embodiment, the formate salt is sodium formate, potassium formate, calcium formate, magnesium formate, or mixtures thereof.

In one embodiment, or in the alternative in combination with any other embodiment, the pH of the antimicrobial composition is from 3.4 to 6.0, from 3.4 to 5.5, from 3.4 to 5.0, from 3.4 to 4.5, or less than 4.0.

In one embodiment, or in the alternative in combination with any other embodiment, the effective amount of the antimicrobial composition is less than 10 wt %, or is less than 5 wt %, or is less than 2.0 wt %, or is less than 1.5 wt %, or is less than 1.0 wt %, or is less than 0.5 wt %, based on the total weight of the animal by-product composition.

In one embodiment, or in the alternative in combination with any other embodiment, the antimicrobial composition is formaldehyde-free.

In one embodiment, or in the alternative in combination with any other embodiment, $R^1$ is H. In one embodiment, or in the alternative in combination with any other embodiment, $R^1$ is OH.

EXAMPLES

Abbreviation

MeOH is methanol; AcOH is acetic acid; HCOH is formaldehyde, FA is formic acid; LA is lactic acid; NaOCH is sodium formate, NaOAc is sodium acetate; MCFA is medium chain fatty acid; Comp. is comparative; Ex is example(s); rt is room temperature; g is gram; CFU is colony forming unit; wt % is weight percent; MLC is minimum lethal concentration;

1. Formulations

TABLE 1

| | | Antimicrobial Formulation | | | | | | | |
|---|---|---|---|---|---|---|---|---|---|
| Ex # | pH | FA (wt %) | PrOH (wt %) | LA (wt %) | NaOCH (wt %) | MCFA C$_{8-10}$ (wt %) | Ethoxylated Castor Oil | Thymol (wt %) | Water (wt %) |
| 1 | <2 | 67.5 | 20 | | | | | | 12.5 |
| 2 | <2 | 43.5 | 15 | | 15.3 | | | | 26.2 |
| 3 | <1.5 | 49.4 | — | 25.8 | 4.2 | | | | 20.6 |
| 4 | <1 | 53.4 | 25.0 | | | 16 | 5 | 0.36 | 0.2 |

Comp. Ex #5

Comp. Ex 5 is a solution comprising HCOH (33 wt % stabilized by MeOH), PrOH (10.8 wt %), and water (56.2 wt %). The pH of the solution was adjusted to 4.6 with NaOH.

Comp. Ex 6 (Termin 8)

Termin 8 is a formaldehyde based product sold by Anitox.

Chicken by-Product Meal

The chicken by-product meal was made from chicken by-product and is naturally nonhomogeneously contaminated by *Salmonella*.

Chicken Meat Bone Meal

The chicken bone meal is a mixture 65-75% meat bone meal (with 11-16% fat content), 20-35% feather meal (with 6% fat content), and a minor amount of blood meal. The chicken meat bone meal is naturally contaminated with *Salmonella*. Using the Most Probable Number method, the *Salmonella* level was found to be <0.4 CFU/g.

Blend Meal Extract

The Blend Meal Extractis a meat-bone meal that is a mixture of chicken, beef, and pork meal protein. A hot water extract of the blend meal that was filtered was used for the MLC test disclosed below.

Blend Meal

The Blend meal is a mixture of chicken, beef and pork meal protein.

2. Efficacy Study-1

The efficacy study was performed on chicken by-product meal. The antimicrobial treatments were applied at various dosage concentrations into the chicken by-product meal by intense mixing. The compositions are shown in Table 2.

TABLE 2

| Sample # | Antimicrobial Treatment (Ex #) | Dosage levels (wt %) | Target Innoculated *Salmonella* Level (CFU/g) |
|---|---|---|---|
| Negative Control-1 | — | — | 0 |
| Positive Control-1 | — | — | 35 |

TABLE 2-continued

| Sample # | Antimicrobial Treatment (Ex #) | Dosage levels (wt %) | Target Innoculated *Salmonella* Level (CFU/g) |
|---|---|---|---|
| 1-1 | 1 | 1 | 35 |
| 1-2 | 1 | 2.5 | 35 |
| 3-1 | 3 | 2.5 | 35 |
| 4-1 | 4 | 2.5 | 35 |
| 5-1 | Comp. Ex 5 | 0.2 | 35 |
| 5-2 | Comp. Ex 5 | 0.6 | 35 |

A cocktail of four *Salmonella* strains (*Salmonella typhimurium, Salmonella senftenberg, Salmonella montevideo*, and *Salmonella enteritidis*) were prepared as a dry inoculum following FDA #80 guidance. The *Salmonella* cocktail was inoculated (35 CFU/g) into antimicrobial treated and untreated chicken by-product meal (Positive Control, Samples 1-1, 1-2, 3-1, 4-1, 5-1 and 5-2) on Day 0. After the *Salmonella* inoculation, all samples were stored at rt with 30-60% humidity.

Subsamples were collected at Day 0 right after inoculation, Day 1, Day 7, Day 14 from the inoculated and antimicrobial treated chicken by-product meal (Samples 1-1, 1-2, 3-1, 5-1, and 5-2), inoculated without antimicrobial treatment chicken by-product meal (Positive Control), and original chicken by-product meal (Negative Control). *Salmonella* levels were analyzed in these subsamples using Most-Probable-Number method following USDA MLG Appendix 2.05 method.

On Day 14, the *Salmonella* cocktail was re-inoculated into antimicrobial treated chicken by-product meal (Samples 1-1, 1-2, 3-1, 5-1, and 5-2) and blank chicken by-product meal (Positive Control) at a targeted *Salmonella* level of 35 CFU/gram. After the *Salmonella* re-inoculation, all samples were stored at rt with 30-60% humidity.

Subsamples were collected at Day 15, Day 22 and Day 62 from the samples. *Salmonella* levels were analyzed in these subsamples using the Most-Probable-Number method.

In general, chicken by-product meal that was treated with Ex 1 at 2.5 wt % showed reduced *Salmonella* level, which is comparable with the reduction efficacy as Ex 5 (formaldehyde-based solution) at 0.2 wt % and 0.6 wt %. Table 3 shows the results for the inoculation study. The data is presented in CFU/g and Log of cells/g for *Salmonella* level.

TABLE 3

| Sample # | Day 0 | Day 1 | Day 7 | Day 14 | Day 15 after re-inoculate | Day 22 after re-inoculate | Day 62 after re-inoculate |
|---|---|---|---|---|---|---|---|
| | | | *Salmonella* Level (CFU/g) [Log of Cells/g] | | | | |
| Negative control | 9.3 [0.97] | 43.0 [1.63] | 75.0 [1.88] | 460.0 [2.66] | 23.0 [1.36] | 2.3 [0.36] | 93 [1.97] |
| Positive control | 100.7 [1.4] | 100.7 [1.4] | 60.77 [1.5] | 18.31 [0.88] | 30.80 [1.36] | 159.27 [1.46] | 9.9 [0.79] |
| 1-1 | — | 2.30 [0.36] | 10.60 [0.95] | 9.3 [0.97] | 93 [1.97] | 4.3 [0.63] | 9.3 [0.97] |
| 1-2 | — | <0.30 [−0.52] | 0.31 [−0.36] | 4.54 [0.24] | 0.67 [−0.23] | 0.55 [−0.29] | 1.35 [−0.06] |
| 3-1 | — | 3.80 [0.58] | — | 2.10 [0.32] | 150.00 [2.18] | 23.0 [1.36] | 150 [2.18] |
| 4-1 | — | 240 [2.38] | — | — | — | — | — |
| 5-1 | — | 0.92 [−0.04] | — | 1.10 [0.04] | 0.36 [−0.44] | 0.92 [−0.04] | 0.3 [−0.52] |
| 5-2 | — | 1.50 [0.18] | — | 0.36 [−0.44] | 0.36 [−0.44] | 0.36 [−0.44] | 0.72 [−0.14] |

3. Efficacy Study-2

This efficacy study measured the *Salmonella* level of meat-bone meal inoculated with *Salmonella typhimurium*. Sterile water was added to meat-bone meal to increase moisture level to 22.5% (v/v), water activity (Aw)=0.906 in order to support *Salmonella* survival in the matrix. Antimicrobial treatments were applied into the chicken meat-bone meal by intense mixing following dosage concentrations for each treatment in table below. The broth culture of *Salmonella typhimurium* was inoculated into antimicrobial treated meat-bone meal and blank meat-bone meal as positive control at $1.15 \times 10^7$ CFU/g on Day 0. After *Salmonella* inoculation, all samples were sealed and stored at rt. Subsamples were collected in triplicate at Day 0 right after inoculation, Day 1, Day 3, Day 7, Day 14 from inoculated and antimicrobial treated meat-bone meal, inoculated without antimicrobial treatment meat-bone meal (positive control), and original meat-bone meal (negative control). *Salmonella* levels were analyzed in these subsamples using direct plating method. The detection limit of direct plating method is 100 CFU/g.

TABLE 4

| Sample # | Antimicrobial Treatment (Ex #) | Dosage levels (wt %) | Target Innoculated *Salmonella* Level (CFU/g) |
|---|---|---|---|
| Negative Control-2 | — | — | — |
| Positive Control-2 | — | — | $1.15 \times 10^7$ |
| 1-3 | 1 | 0.5 | $1.15 \times 10^7$ |
| 1-4 | 1 | 1 | $1.15 \times 10^7$ |
| 1-5 | 1 | 2 | $1.15 \times 10^7$ |
| 2-1 | 2 | 0.5 | $1.15 \times 10^7$ |
| 2-2 | 2 | 1 | $1.15 \times 10^7$ |
| 2-3 | 2 | 2 | $1.15 \times 10^7$ |
| 4-2 | 4 | 0.5 | $1.15 \times 10^7$ |
| 4-3 | 4 | 1 | $1.15 \times 10^7$ |
| 4-4 | 4 | 2 | $1.15 \times 10^7$ |
| 6-1 | 6 (Termin-8) | 0.1 | $1.15 \times 10^7$ |
| 6-2 | 6 (Termin-8) | 0.25 | $1.15 \times 10^7$ |
| 6-3 | 6 (Termin-8) | 0.5 | $1.15 \times 10^7$ |

In general, meat-bone meal that was treated with Ex 1 at 2 wt % dosage concentration and Ex 4 at 2 wt % dosage concentration showed reduced *Salmonella* level, which is comparable with the reduction efficacy of Termin-8 (formaldehyde-based powder) at 0.5 wt %. The data are presented in Table 5.

TABLE 5

| Sample # | Day 0 | Day 1 | Day 3 | Day 7 | Day 14 |
|---|---|---|---|---|---|
| | *Salmonella* Level (CFU/g) [Log of cells/g] | | | | |
| Positive Control | 1.15E+07 [7.06] | 7.17E+05 [5.71] | 1.23E+04 [4.08] | 5.80E+03 [3.76] | 3.83E+03 [3.58] |
| Negative Control | <100 [<2] | <100 [<2] | <100 [<2] | <0.5 [<2] | <0.5 [<0.3] |
| 1-3 | 1.15E+07 [7.06] | 5.97E+05 [5.69] | 1.14E+04 [4.0] | 3.27E+03 [3.51] | 2.00E+02 [2.26] |
| 1-4 | 1.15E+07 [7.06] | 1.67E+05 [4.99] | 5.80E+03 [3.73] | 6.67E+02 [2.76] | <100 [<2] |
| 1-5 | 1.15E+07 [7.06] | 1.75E+04 [4.16] | 3.67E+02 [2.52] | <100 [<2] | <100 [<2] |
| 2-1 | 1.15E+07 [7.06] | 5.53E+05 [5.74] | 1.43E+04 [4.15] | 5.00E+03 [3.70] | 4.33E+02 [2.63] |
| 2-2 | 1.15E+07 [7.06] | 2.40E+05 [5.27] | 1.38E+04 [4.14] | 2.27E+03 [3.35] | 2.00E+02 [2.26] |
| 2-3 | 1.15E+07 [7.06] | 2.33E+05 [5.31] | 4.63E+03 [3.67] | 1.00E+02 [2.0] | <100 [<2] |

TABLE 5-continued

| Sample # | Day 0 | Day 1 | Day 3 | Day 7 | Day 14 |
|---|---|---|---|---|---|
| | *Salmonella* Level (CFU/g) [Log of cells/g] | | | | |
| 4-2 | 1.15E+07 [7.06] | 6.00E+05 [5.66] | 1.42E+04 [4.13] | 3.67E+03 [3.55] | 8.33E+02 [2.89] |
| 4-3 | 1.15E+07 [7.06] | 7.90E+05 [5.84] | 9.43E+03 [3.96] | 2.67E+02 [2.36] | <100 [<2] |
| 4-4 | 1.15E+07 [7.06] | 3.06E+04 [4.47] | 3.67E+02 [2.44] | <100 [<2] | <100 [<2] |
| 6-1 | 1.15E+07 [7.06] | 3.75E+04 [4.57] | 1.01E+04 [3.99] | 2.87E+03 [3.46] | 1.37E+03 [3.13] |
| 6-2 | 1.15E+07 [7.06] | 1.45E+04 [4.12] | 9.33E+02 [2.96] | 3.33E+02 [2.38] | 1.33E+02 [2.10] |
| 6-3 | 1.15E+07 [7.06] | 3.30E+03 [3.44] | <100 [<2] | <100 [<2] | <100 [<2] |

3. Efficacy Study-3

The formulations were tested to determine their MLC for select *Salmonella* strains. A hot water extract of blend meal was prepared and then sterile-filtered before being used as the culture medium, and four *Salmonella* strains were inoculated into the medium at 5E3 to 1E5 CFU/well into 96-well microplate. Antimicrobials treatments were added to the 96-well plates following a serial dilution in four replicates. After 24-hour culture at 30° C., an aliquot from the wells representing the lowest three or four concentrations of each antimicrobial treatments that resulted in no growth of *Salmonella* (either visually clear of medium and/or no significant Optical Density (OD600) change before and after incubation) were transferred to an agar plate to monitor for survival of the *Salmonella*. The lowest concentration of antimicrobial that resulted in no recovery of viable *Salmonella* was defined as a minimum lethal concentration.

Ex 1 and Ex 3 exhibited stronger anti-*Salmonella* activity than the other tested formulations in current MLC test.

TABLE 6

| Bacteria information | | | MLC (wt % in medium) | | | |
|---|---|---|---|---|---|---|
| Strain # | Strain ID | Source | Ex 1 | Ex 2 | Ex 3 | Ex 4 |
| 1905 | *S. senftenberg* | ATCC | 0.063 | 0.125 | 0.063 | 0.125 |
| 1909 | *S. Montevideo* | ATCC | 0.063 | 0.125 | 0.063 | 0.063 |
| 1911 | *S. Montevideo* | Isolated from chicken by-product meal | 0.063 | 0.125 | 0.063 | 0.125 |
| 1913 | *S. senftenberg* | Isolated from blend meal | 0.063 | 0.125 | 0.063 | 0.125 |

4. Efficacy Study-4

The formulations Ex 1 and Comp. Ex 5 were tested to determine their efficacy on *Salmonella* control in naturally contaminated blend meal in lab-scale test. Ex 1 and Comp. Ex 5 were added to the naturally contaminated blend meal at different dosage concentrations using a lab-scale atomizer and mixed well in a lab-scale orbit mixer (Table 7). *Salmonella* incidence rate was monitored at Day 0, 1, 3, 5, 7 and 14 by analyzing the *Salmonella* positive rate in 16 subsamples for each treatment group. It was found that 2% Ex 1 treatment led to a 43.75% incidence rate at Day 14 after treatment, which achieved the target performance of 50% reduction of *Salmonella* incidence rate comparing to the Control group, which had no treatment (Table 8).

TABLE 7

| Sample # | Antimicrobial Treatment (Ex #) | Dosage levels (wt %) |
|---|---|---|
| Control | — | — |
| 1-1 | 1 | 0.5 |
| 1-2 | 1 | 1.0 |
| 1-3 | 1 | 2.0 |
| 1-4 | 1 | 3.0 |
| Comp. 5-1 | Comp. Ex 5 | 0.4 |

TABLE 8

| Sample # | Salmonella positive rate (%) | | | | | |
|---|---|---|---|---|---|---|
| | Day 0 | Day 1 | Day 3 | Day 5 | Day 7 | Day 14 |
| Control | 93.75 | 100.00 | 93.75 | 100.00 | 100.00 | 93.75 |
| 1-1 | | 100.00 | 100.00 | 100.00 | 100.00 | 100.00 |
| 1-2 | | 100.00 | 100.00 | 93.75 | 100.00 | 100.00 |
| 1-3 | | 93.75 | 75.00 | 75.00 | 62.50 | 43.75 |
| 1-4 | | 87.50 | 37.50 | 37.50 | 18.75 | 37.50 |
| Comp. 5-1 | | 43.75 | 25.00 | 18.75 | 25.00 | 12.50 |

5. Efficacy Study-5

The formulation Ex 1 was tested to determine its efficacy on *Salmonella* control in naturally contaminated blend meal under commercial production condition. For the study, different animal protein meals were added by a front loader to 5 US ton an open mixer. There, they were mixed to yield the desired final blend meal. Ex 1 was added to the open mixer during the mixing process by nozzles spray at 0.3%, 0.6%, 1.2%, 1.75%, and 2.4%. For each treatment level as well as the blank (before treatment), 16 samples were collected and analyzed for *Salmonella* presence/absence to calculate the *Salmonella* incidence rate on Day 2, 3 and 5 post-treatment (Table 9). Results suggested that a 1.2% dosing level provided the desired 50% reduction on *Salmonella* incidence rate comparing to Blank control, without any treatment, which was 100% *Salmonella* positive (Table 10).

TABLE 9

| Sample # | Antimicrobial Treatment (Ex #) | Dosage levels (wt %) |
|---|---|---|
| Blank Control | — | — |
| 1-1 | 1 | 0.3 |
| 1-2 | 1 | 0.6 |
| 1-3 | 1 | 1.2 |
| 1-4 | 1 | 1.75 |
| 1-5 | 1 | 2.4 |

TABLE 10

| Sample # | Salmonella incidence rate (%) | | |
|---|---|---|---|
| | Day 2 | Day 3 | Day 5 |
| Control | 100.00 | 100.00 | 100.00 |
| 1-1 | 93.75 | 87.50 | 87.50 |
| 1-2 | 56.25 | 43.75 | 81.25 |
| 1-3 | 43.75 | 31.25 | 25.00 |
| 1-4 | 12.50 | 12.50 | 31.25 |
| 1-5 | 12.50 | 0.00 | 0.00 |

6. Efficacy Study-6

The formulation Ex 1 was tested to validate its efficacy on *Salmonella* control in naturally contaminated blend meal under commercial production condition. For the study, setup was the same as Study-5. Ex 1 was added to the open mixer during the mixing process by nozzles spray at 1% at three different production batches. 32 samples from Blank group (before Ex 1 treatment) and 16 samples from each treated batch were collected and analyzed for *Salmonella* presence/absence to calculate the *Salmonella* incidence rate on Day 2, 3 and 5 post-treatment (Table 11). Average of the *Salmonella* incidence rate from the three batched was calculated (Table 12). Results suggested that a 1% dosing level provided the desired 50% reduction on *Salmonella* incidence rate comparing to Blank control, containing no treatment, which was 100% *Salmonella* positive.

TABLE 11

| Sample # | Antimicrobial Treatment (Ex #) | Dosage levels (wt %) |
|---|---|---|
| Blank Control | — | — |
| 1-1 | 1 | 1 |

TABLE 12

| Sample # | Salmonella incidence rate (%) | | |
|---|---|---|---|
| | Day 2 | Day 3 | Day 5 |
| Control | 100.00 | 100.00 | 100.00 |
| 1-1 | 62.50 | 56.25 | 40.63 |

7. Efficacy Study-7

The formulation Ex 1 and Comp. Ex 5 were tested to evaluate their impact on the protein digestibility of blend animal protein meal. Ex 1 and Comp. Ex 5 were added to blank blend animal protein meal using a lab-scale atomizer and mixed well in a lab-scale orbit mixer (Table 13). Pepsin digestibility test was conducted on blank and treated samples following AOAC 971.09 method with pepsin concentration as 0.2%, 0.02% and 0.002%. Results showed that with pepsin concentration at 0.02% and 0.002%, Comp. 5-1 and Comp. 5-2 treated samples showed statistically significant lower protein digestibility than 1-1, 1-2 and 1-3 treated samples and blank samples.

TABLE 13

| Sample # | Antimicrobial Treatment (Ex #) | Dosage levels (wt %) |
|---|---|---|
| Control | — | — |
| 1-1 | 1 | 0.5 |
| 1-2 | 1 | 1.0 |
| 1-3 | 1 | 1.5 |
| Comp 5-1 | Comp. Ex 5 | 0.4 |
| Comp 5-2 | Comp. Ex 5 | 0.6 |

TABLE 14

| Sample # | Pepsin concentration | | |
|---|---|---|---|
| | 0.20% | 0.02% | 0.002% |
| Control | 89.73 | 85.37 | 71.01 |
| 1-1 | 89.95 | 84.68 | 70.67 |
| 1-2 | 89.20 | 84.76 | 70.56 |
| 1-3 | 89.16 | 85.01 | 69.97 |

TABLE 14-continued

| | Pepsin concentration | | |
| --- | --- | --- | --- |
| Sample # | 0.20% | 0.02% | 0.002% |
| Comp 5-1 | 89.38 | 81.54 | 63.28 |
| Comp 5-2 | 88.67 | 79.95 | 61.48 |

Forms of the invention described above are to be used as illustration only, and should not be used in a limiting sense to interpret the scope of the present invention. Modifications to the embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A method of inhibiting the development of the species of the genus *Salmonella* in an animal by-product composition comprising adding an effective amount of an antimicrobial composition, comprising:
  (i) 15 to 60 weight percent (wt %) $CH_3CHR^1COOH$, wherein $R^1$ is H or OH;
  (ii) 30 to 80 wt % formic acid, and
  (iii) 10 to 20 wt % of a ($C_{6-12}$) fatty acid,
  wherein each component is based on the total weight of the antimicrobial composition;
to the animal by-product composition.

2. The method of claim 1, wherein the ($C_{6-12}$) fatty acid comprises caprylic acid, capric acid, lauric acid, or mixtures thereof.

3. The method of claim 1, wherein the antimicrobial composition further comprises (iv) 0.05 to 50 wt % of a monoterpene.

4. The method of claim 3, wherein the monoterpene comprises (−)-menthyl acetate, (+)-camphoric acid, cantharidin, carvacrol, p-cymene, (R)-(−)-carvone, (S)-(+)-carvone, cis-(−)-carveol, m-cymene, o-cymene, (1S,3R)-(−)-camphoric acid, ethyl chrysanthemate, N-ethyl-p-menthane-3-carboxamide, hinokitiol, cuminaldehyde, cis-1-isopropyl-4-methylcyclohexane, dehydroxylinalool oxide, L-menthyl glyoxylate hydrate, L-menthyl L-lactate, (+)-limonene, (−)-limonene, linalool oxide, (−)-a-phellandrene, a-terpinene, y-terpinene, terpinen-4-ol, a-terpineol, β-terpineol, y-terpineol, isopulegol, (+)-menthol, (−)-menthol, thymol, (−)-menthone, (−)-menthol, (−)-menthoxyacetyl chloride, menthoxyacetic acid, (−)-menthyl chloride, (−)-menthyl chloroformate, (1R,2S,5R)-(−)-menthyl(S)-p-toluenesulfinate, (1S,2R,5S)-(+)-menthyl (R)-p-toluenesulfinate, (+)-menthyl chloroformate, 8-mercaptomenthone, (−)-menthyl succinate, (+)-menthyl acetate, (+)-neomenthol, (−)-perillaldehyde, piperitone, (+)-pulegone, a-terpineol, terpinyl acetate, terpinolene, a-terpineol, terpin monohydrate, (+)-terpinen-4-ol, linalool oxide pyranoid, borneyl acetate, (+)-3-bromocamphor, (+)-borneol, (−)-borneol, (+)-3-bromo-camphor-8-sulfonic acid, (−)-3-bromocamphor-8-sulfonic acid, (+)-camphene, (−)-camphene, (+)-camphor, (−)-camphor, (1R)-camphor oxime, (+)-camphorquinone, (−)-camphorquinone, (+)-10-camphorsulfuric acid, (+)-10-camphorsulfuric acid, (−)-10-camphorsulfuric acid, sodium (+)-10-camphorsulfonate, sodium (−)-10-camphorsulfonate, (+)-3-carene, 1,8-cineole, (−)-10-camphosulfuric aid, (+)-10-camphorsulfonyl chloride, (−)-camphanic acid, (−)-camphanic chloride, (−)-camphor, (−)-10-camphosulfonyl chloride, (+)-10,2-camphorsultam, (−)-10,2-camphorsultam, (2R,8aS)-(+)-(camphorylsulfonyl) oxaziridine, (2S,8aR)-(−)-(camphorylsulfonyl) oxaziridine, (+)-10-camphorsulfonimine, (−)-10-camphorsulfonimine, (1 R)-(−)-camphorquinone, (1S)-(+)-camphorquinone, anti-(1R)-(+)-camphorquinone 3-oxime, 1,4-cineole, (+)-3,9-dibromocamphor, eugenol, (+)-fenchone, (−)-fenchone, fraxinellone, geniposide, genipin, (1R,2R,5R)-(+)-2-hydroxy-3-pinanone, (1S,2S,5S)-(−)-2-hydroxy-3-pinanone, (+)-isoborneol, (−)-isoborneol, isobornyl acetate, isobornyl methacrylate, isobornyl acrylate, (S)-(+)-ketopinic acid, (1S)-(−)-10-mercaptoisoborneol, (1 S)-(−)-10-mercaptobor-neol, (1 R)-(−)-myrtenal, (1 R)-(−)-myrtenal, (1S)-(−)-a-pinene, (−)-β-pinene, (1R)-(+)-a-pinene, pinene oxide (α- or β-), paeoniflorin, (1S,2S,3R,5S)-(+)-2,3-pinanediol, sabinene, swertiamarin, thujone (α- or β-), (1R)-(−)-thiocamphor, (1 R,4R,5R)-4,7,7-trimethyl-6-thiabicyclo[3.2.1.]octane, (1S,4S,5S)-4,7,7-trimethyl-6-thiabicyclo[3.2.1.]octane, verbenone, or mixtures thereof.

5. The method of claim 4, wherein the monoterpene comprises thymol, carvacrol, eugenol, or a mixture thereof.

6. The method of claim 1, wherein the antimicrobial composition further comprises: (v) less than 30 wt % water.

7. The method of claim 1, wherein the antimicrobial composition further comprises (vi) 0.05 to 15 wt % of a surfactant.

8. The method of claim 1, wherein the antimicrobial composition further comprises (vii) 0.05 wt % to 20 wt % of a formate salt.

9. The method of claim 8, wherein the formate salt is sodium formate, potassium formate, calcium formate, magnesium formate, or mixtures thereof.

10. The method of claim 1, wherein the pH of the antimicrobial composition is from 3.4 to 6.0.

11. The method of claim 1, wherein the effective amount of the antimicrobial composition is less than 5 wt %, based on the total weight of the animal by-product composition.

12. The method of claim 1, wherein the antimicrobial composition is formaldehyde-free.

13. The method of claim 1, wherein $R^1$ is H.

14. The method of claim 1, wherein $R^1$ is OH.

15. The method of claim 1, wherein the animal by-product composition is a rendered animal protein composition.

* * * * *